(12) United States Patent
Buck et al.

(10) Patent No.: US 8,387,804 B2
(45) Date of Patent: Mar. 5, 2013

(54) DIFFUSION AND/OR FILTRATION DEVICE

(75) Inventors: Reinhold Buck, Alleshausen (DE); Jürgen Eichinger, Bisingen-Steinhofen (DE); Roland Henle, Haigerloch-Stetten (DE)

(73) Assignee: Gambro Lundia AB, Lund (SE)

( * ) Notice: Subject to any disclaimer, the term of this patent is extended or adjusted under 35 U.S.C. 154(b) by 86 days.

(21) Appl. No.: 13/055,630

(22) PCT Filed: Aug. 17, 2009

(86) PCT No.: PCT/EP2009/005943
§ 371 (c)(1),
(2), (4) Date: Jan. 24, 2011

(87) PCT Pub. No.: WO2010/020384
PCT Pub. Date: Feb. 25, 2010

(65) Prior Publication Data
US 2011/0120932 A1    May 26, 2011

(30) Foreign Application Priority Data
Aug. 22, 2008 (EP) .................... 08014907

(51) Int. Cl.
*B01D 27/08* (2006.01)
*B01D 27/00* (2006.01)
*B01D 63/02* (2006.01)

(52) U.S. Cl. .............. 210/456; 210/232; 210/321.79; 210/321.8; 210/321.88; 210/321.89

(58) Field of Classification Search .......... 210/232, 210/321.79, 321.8, 321.88, 321.89, 456
See application file for complete search history.

(56) References Cited

U.S. PATENT DOCUMENTS

| | | | |
|---|---|---|---|
| 4,141,835 A | 2/1979 | Schael et al. |
| 4,201,673 A | 5/1980 | Kanno et al. |
| 4,720,343 A | 1/1988 | Walch et al. |
| 4,882,223 A | 11/1989 | Aptel et al. |
| 5,009,824 A | 4/1991 | Walch et al. |
| 5,053,130 A | 10/1991 | Raff et al. |
| 5,072,498 A | 12/1991 | Raff et al. |
| 5,340,480 A | 8/1994 | Kawata et al. |
| 6,074,559 A | 6/2000 | Hahmann et al. |
| 6,409,024 B1 | 6/2002 | Nakashima et al. |
| 6,641,731 B1 | 11/2003 | Heilmann et al. |
| 7,014,765 B2 | 3/2006 | Dannenmaier |
| 2003/0155294 A1 | 8/2003 | Heilmann et al. |
| 2010/0170850 A1 | 7/2010 | Heilmann et al. |

FOREIGN PATENT DOCUMENTS

| | | |
|---|---|---|
| DE | 2646358 | 4/1978 |
| DE | 3144552 | 5/1983 |
| DE | 3144553 | 5/1983 |
| DE | 19857850 A1 | 6/2000 |

(Continued)

OTHER PUBLICATIONS

Klein, F, et al., "Transport and Mechanical Properties of Hemodialysis Hollow Fibers", 1976, Journal of Membrane Science, No. 1, pp. 371-396.

(Continued)

*Primary Examiner* — John Kim
(74) *Attorney, Agent, or Firm* — Barnes & Thornburg LLP

(57) ABSTRACT

The present disclosure relates to a diffusion and/or filtration device, such as a dialyzer, hemofilter, or ultra-filter, having improved flow characteristics. The invention also relates to an end cap for the device.

20 Claims, 16 Drawing Sheets

DETAIL B
SCALE 8:1

FOREIGN PATENT DOCUMENTS

| | | |
|---|---|---|
| EP | 0082433 | 6/1983 |
| EP | 0168783 | 1/1986 |
| EP | 0305687 | 3/1989 |
| EP | 0305787 | 8/1989 |
| EP | 0568045 | 11/1993 |
| EP | 0750936 | 1/1997 |
| EP | 0844015 | 5/1998 |
| EP | 1027899 | 8/2000 |
| JP | 04135628 | 5/1992 |
| JP | 04135628 | 5/1995 |
| JP | 09108338 | 4/1997 |
| WO | WO86/00028 | 1/1986 |
| WO | WO01/60477 | 8/2001 |
| WO | WO01/60502 | 8/2001 |
| WO | WO2004/056469 | 7/2004 |
| WO | WO2004056459 | 7/2004 |

OTHER PUBLICATIONS

International Search Report/Written Opinion for PCT/EP2009/005943 completed Nov. 20, 2009.

DETAIL B
SCALE 8:1

US 8,387,804 B2

DIFFUSION AND/OR FILTRATION DEVICE

CROSS-REFERENCE TO RELATED APPLICATIONS

This application is the U.S. national phase of PCT/EP2009/005943 filed Aug. 17, 2009. PCT/EP2009/005943 claims priority to European patent application 08014907.3 filed Aug. 22, 2008. The disclosures of both European patent application 08014907.3 and PCT/EP2009/005943 are hereby incorporated herein by reference.

TECHNICAL FIELD

The present disclosure relates to a diffusion and/or filtration device, such as a dialyzer, hemofilter, or ultra-filter, having improved flow characteristics. The invention also relates to an end cap for the device.

DESCRIPTION OF THE RELATED ART

Diffusion and/or filtration devices used as dialyzers, hemofilters, or ultrafilters generally encompass a casing comprising a tubular section with end caps capping the mouths of the tubular section. A bundle of hollow fiber membranes is usually arranged in the casing in a way that a seal is provided between the first flow space formed by the fiber cavities and a second flow space surrounding the membranes on the outside. One problem with the design of the inflow and/or outflow chambers connected to the first flow space, i.e., to the hollow fiber bundle, is to distribute the liquid evenly between the individual fibers of the hollow fiber bundle, and to avoid the formation of dead zones in the inlet chamber, i.e. areas where the flow velocity is approximately zero. Blood clots may form in such dead zones, and after completion of a dialysis treatment, some of the patient's blood remains there. As the cross-section of the inlet is smaller than the cross-section of the fiber bundle, the velocity of the blood-flow is reduced. Hence, the blood may be exposed to mechanical stress due to the velocity gradient between the inlet and the fibers. The design of the end caps therefore is of particular importance to ensure optimal operation of the device. Several proposals have been made in the prior art:

DE 26 46 358 A1 describes a filter device where the end caps have a tangential inlet and the blood is carried in a channel in circulation through the ends of the hollow fibers. Blood flows tangentially through the hollow fiber ends. To achieve the most uniform possible distribution of liquid, only the areas of the casting compound in overflow circulation are provided with hollow fibers, while the rest of the core area does not have any fibers. This achieves uniform loading of the fibers but also results in a relatively low capacity or less than optimum utilization of the filter device on the whole due to the lack of hollow fibers at the center of the casing. To achieve a uniform rate of circulation of blood in the channel, the cross-sectional area of the channel in one embodiment decreases in the direction of flow.

DE 198 57 850 A1 discloses a filtration device where the inlet or outlet chamber, respectively, is adjacent to an essentially circular or semicircular channel arranged approximately centrally with the hollow fiber bundle which communicates with an inlet or outlet of the filter device and is open in the direction towards the ends of the hollow fibers and has a cross-sectional area that decreases in the direction of flow and an outside diameter which is smaller than the diameter of the hollow fiber bundle. As the inlet is located parallel to the plane of the fiber ends, the direction of the liquid flow is changed by 90 degrees in the end area of the inlet, causing turbulences and mechanical stress on the blood.

EP 0 844 015 A2 discloses a filter device having two flow spaces, a first space formed by tubular or capillary tube passages of a hollow-fiber bundle which has been poured into a molding compound at its ends, and a second space formed by the housing surrounding the fiber bundle. first space is sealed off by caps placed on the molding compounds, with sealing devices placed over the peripheral areas of the molding compounds. Caps for the ends of the first space seal to the molding compound and have a connection piece providing inflow/outflow access to the first space. A second set of caps, overlapping the first caps, has a connection piece providing inflow/outflow access to the second space. The edges of the second caps are joined to the housing in a fluid tight manner, so that between the first and second set of caps, interspaces are formed which are connected to the second space. As is apparent from FIG. 1 of the reference, the basal plane of the end cap is parallel to the plane of the molding compound comprising the fibers and the blood-flow through the inlet is deflected at a sharp edge in the cap. Turbulent flow and mechanical stress on the blood are the consequence.

EP-A 0 305 687 teaches a dialyzer in which the inlet of the chambers connected to the hollow fiber bundle is arranged axially, with the axis of the flow channel running approximately through the mid point of the hollow fiber bundle. As apparent from the figures in the reference, the cross-section of the liquid path in the end cap continuously increases between the inlet and the level part of the inside of the end cap, hence there are no sharp edges. The level part is not parallel to the plane formed by the ends of the hollow fibers, but slightly inclined. However, no further details are given in the reference.

Another factor that influences the flow properties of the device is the design of the hollow fiber membrane bundle. As the membranes form the interface between the first and the second flow space of the device and mass transfer processes occurring through the membranes affect the liquid flow in the flow spaces of the device, the material of the hollow fiber membranes and the geometry of both the individual fibers and the fiber bundle as a whole are important factors.

EP 0 305 787 A1 discloses a permselective asymmetric membrane suitable for hemodialysis, hemodiafiltration and hemofiltration of blood, comprised of a hydrophobic first polymer, e.g. polyamide, a hydrophilic second polymer, e.g. polyvinylpyrrolidone, and suitable additives. The membrane has a three-layer structure, comprising a first layer in the form of dense, rather thin skin, responsible for the sieving properties, a second layer in the form of a sponge structure, having a high diffusive permeability and serving as a support for said first layer, and a third layer in the form of a finger structure, giving the membrane a mechanical stability.

WO 2004/056459 A1 discloses a membrane suitable for hemodialysis, comprising at least one hydrophobic polymer, e.g. polyarylethersulfone, and at least one hydrophilic polymer, e.g. polyvinylpyrrolidone. The outer surface of the hollow fiber has pores in the range of 0.5-3 μm and the number of pores in the outer surface is in the range of 10,000 to 150,000 pores per $mm^2$.

WO 01/60477 A2 teaches a filter device, preferably for hemodialysis, consisting of a cylindrical filter housing and a bundle of curled hollow fibers arranged in the filter housing. The curled hollow fibers have an essentially sinusoidal texture and a wavelength λ that is limited by the formula $5d<\lambda<L/12*(1+2D/L)^{-1}$, wherein λ represents the wavelength of the curled hollow fibers, d represents the exterior diameter of the hollow fibers, L represents the effective length of the hollow fibers, and D represents the diameter of the fiber bundle. The amplitude of the curling has a value between d/5 and λ/5.

SUMMARY

It is an object of the present invention to improve upon a generic filter device, so that a more homogeneous liquid flow within the device is obtained and the formation of areas where the liquid velocity is nearly zero (dead zones) is avoided.

According to one aspect of the invention, a diffusion and/or filtration device having improved flow characteristics is provided. The device comprises a housing, a bundle of hollow fiber membranes arranged within the housing, and end caps sealing the mouths of the housing.

According to a further aspect, the invention relates to an end cap for a diffusion and/or filtration device. The end cap is characterized by certain geometric parameters.

DETAILED DESCRIPTION

Figure 1:
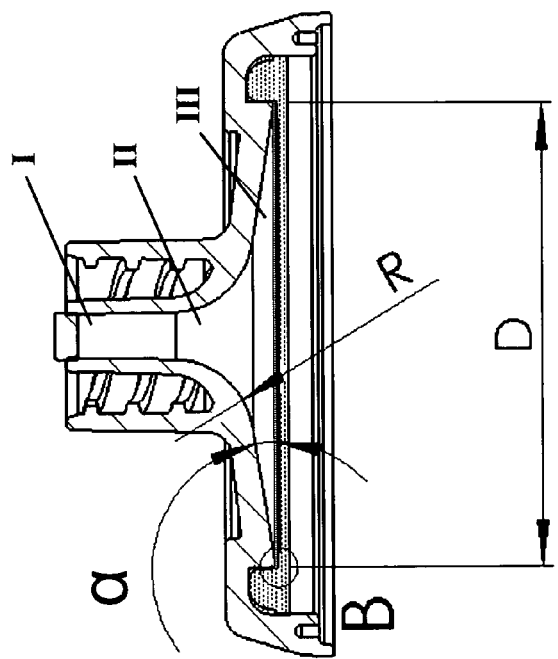
FIG. 1 shows a schematic cross-sectional side view of an embodiment of the end cap of the invention. The shaded area represents a portion of a filtration device sealed by the end cap.
Figure 1:
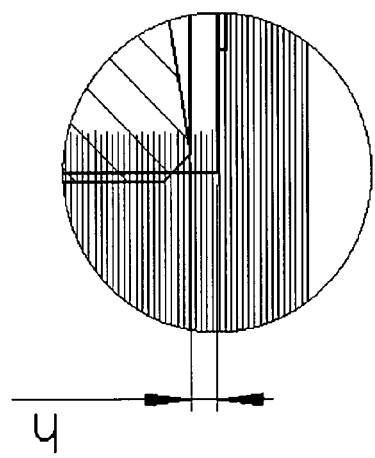

FIG. 1 shows an embodiment of the end cap proposed in the present disclosure. As shown in FIG. 1, the end cap comprises an inlet or outlet, respectively, for a liquid, arranged axially in the center of the end cap. A two-start thread which fits a standard blood-line connector is provided round the inlet or outlet, as the case may be. Starting from the mouth of the end cap, the inner diameter of the inlet or outlet, as the case may be, is constant or increases linearly in a first section (I) of the end cap, then widens gradually, with a constant curvature R, in a second section (II) until the inner surface includes a predetermined angle α with the horizontal. The diameter then increases linearly in a third section (III), until a predetermined diameter D is reached. At diameter D, the fluid compartment formed by the inside of the end caps and the lumen of the hollow fiber membranes, when the end caps are placed on the mouths of the tubular housing of the device, is sealed off by a gasket ring placed in a circular groove provided in the end caps. When the device is assembled, the minimum distance between the inner surface of the end cap and the plane defined by the ends of the hollow fiber membranes is h.

The inner surface of the end cap is axially symmetrical with regard to the longitudinal axis of the inlet/outlet, which is also the longitudinal axis of the end cap. The inner surface has the form of a funnel comprising, in the direction of increasing diameter, a first section (I) taking the form of a cylinder or a truncated cone, a middle section (II) taking the form of a torus segment, and a third section (III) taking the form of a truncated cone.

It has been found that in order to achieve optimized flow characteristics, the following conditions have to be met by the diameter D of the base of the third section (III), the angle α between the base and the lateral surface of the third section (III), and the volume V calculated according to the formula $$\frac{\pi D^2}{4} \cdot \left( h + \frac{D}{6} \tan\alpha \right), \quad (I)$$

wherein h is the minimum distance between the inner surface of the third section (III) of the end cap and the plane defined by the ends of the hollow fiber membranes, when the end cap is mounted on the diffusion and/or filtration device:

$$1{,}000 \cdot D/V > a_1 \cdot (\tan\alpha)^2 + 6 \quad (II)$$

with $a_1=100$; D and h are given in mm.

In another embodiment of the invention, $a_1=120$. In still another embodiment, $a_1=140$.

In one embodiment of the invention, the following conditions are additionally met:

$$1{,}000 \cdot D/V < a_2 \cdot (\tan\alpha)^2 + 9 \quad (III)$$

with $a_2=1{,}400$. V is calculated according to formula II; and D and h are given in mm.

In another embodiment of the invention, $a_2=1{,}200$. In still another embodiment, $a_2=1{,}000$.

In one embodiment of the invention, the diameter D is in the range of from 15 to 60 mm.

In another embodiment of the invention, the following conditions are met:

$$90 \cdot 10^{-6} \text{ mm}^{-2} < \frac{\tan\alpha}{D^2} < 120 \cdot 10^{-6} \text{ mm}^{-2} \quad (IV)$$

In one embodiment of the invention, the radius R of the middle section (II), i.e., the curvature R, is in the range of from 4 mm to 10 mm, e.g. from 5 mm to 9 mm, in particular from 6 to 8 mm.

In one embodiment of the invention, the distance h has a value in the range of from 1.5 mm to 2.0 mm.

In one embodiment of the invention, the aperture of the first section (I) from the inlet to the middle section is in the range of from 0° to 4°, e.g. from 1° to 3°, in particular from 1.5 to 2.5°.

Figure 2:
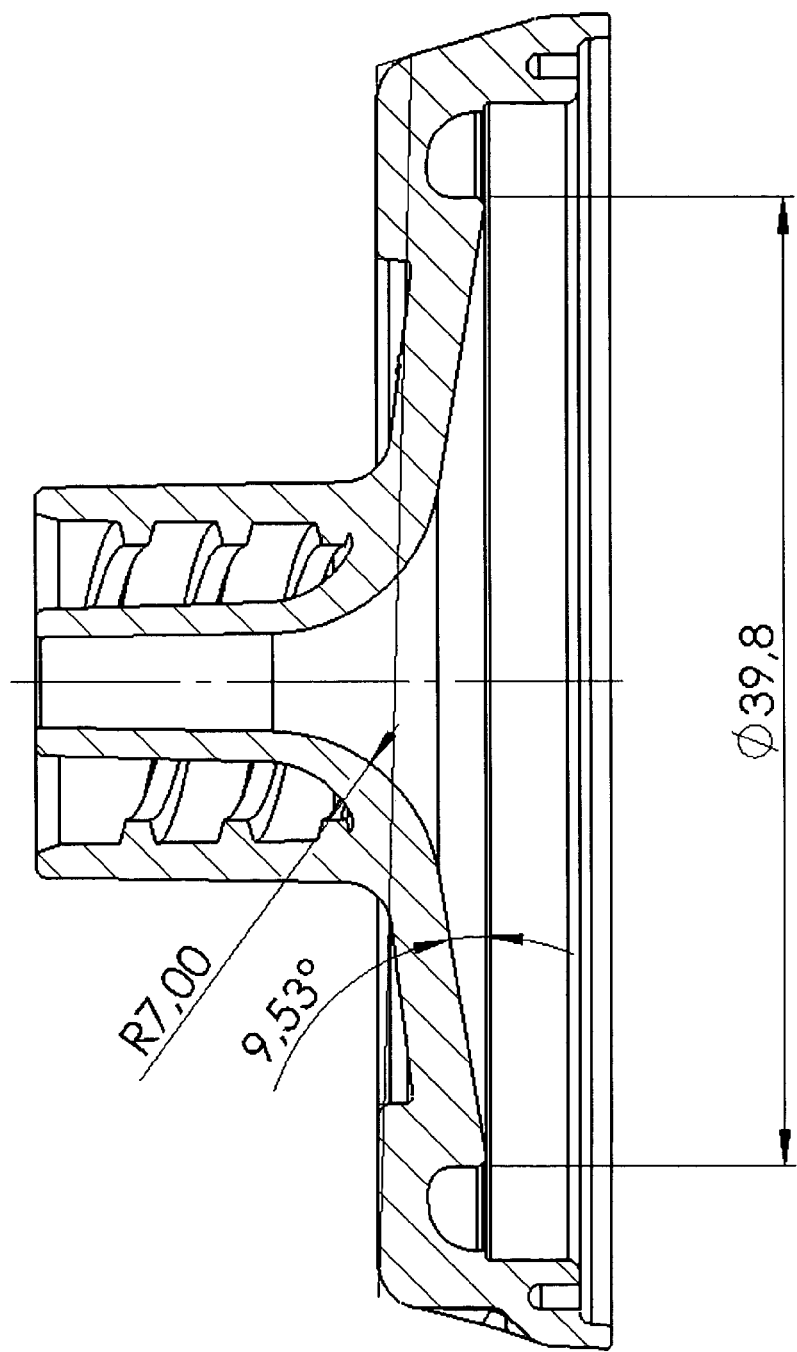
FIG. 2 shows a side, cross-sectional view of another embodiment of the end cap of the invention.

In a particular embodiment of the end cap of the invention shown in FIG. 2, the top of the first section (I), i.e., the inlet of the end cap, has a diameter of 3.7±0.1 mm, the aperture of the first section (I) from the inlet to the middle section is 2.0±0.1°, R is 7.0±0.1 mm, α is 9.53±0.05°, i.e. the aperture of the third section (III) is 160.94±0.10°, D is 39.8±0.05 mm. When the end cap is mounted on a diffusion and/or filtration device, h is 1.75±0.08 mm.

Another aspect of the present invention is a diffusion and/or filtration device comprising a housing (1), a bundle of semi-permeable hollow fiber membranes (2) arranged within the housing, and end caps (4a,4b) according to the present invention sealing the mouths of the tubular housing.

Figure 3A:
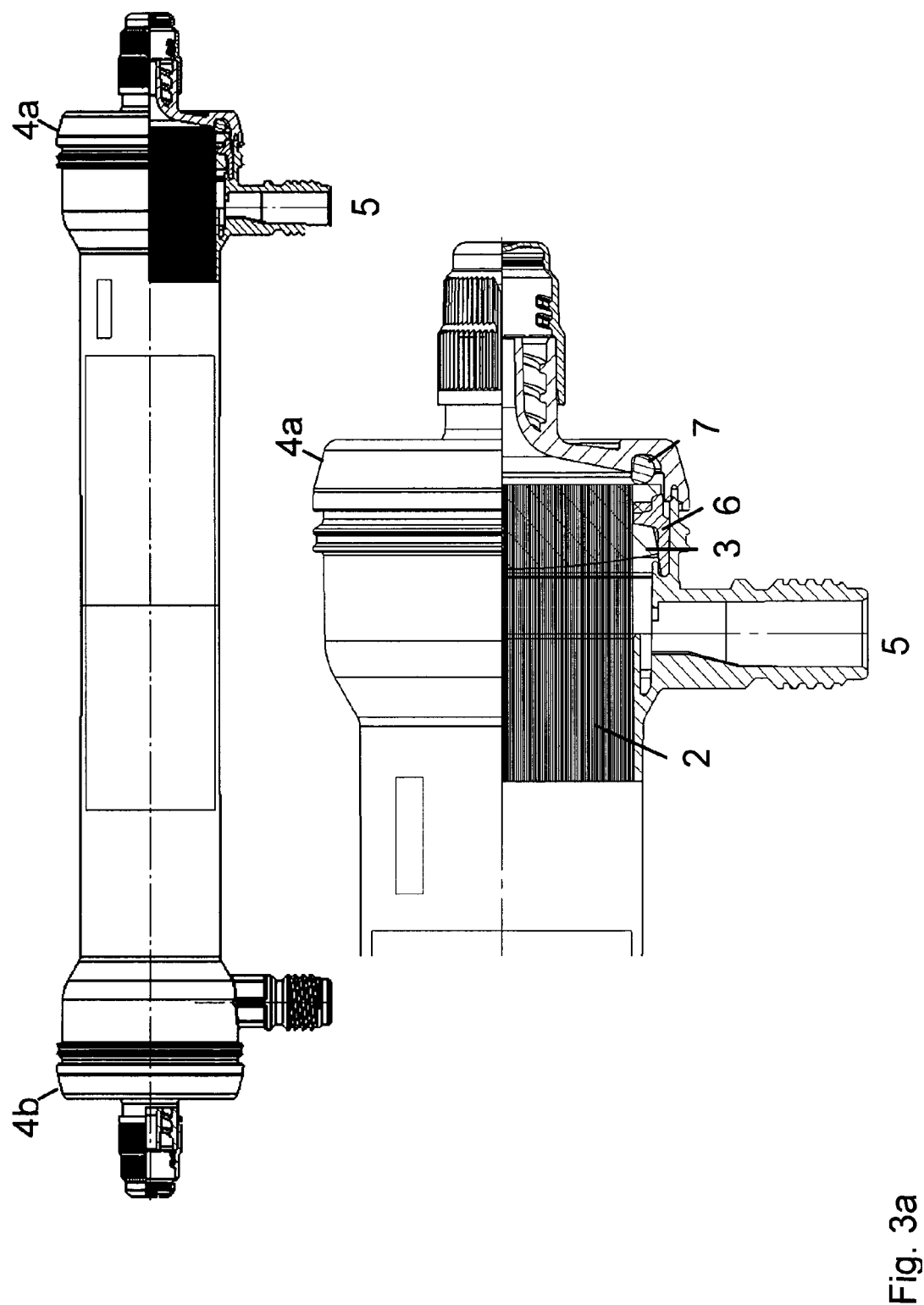
FIG. 3a shows a side, partially cross-sectional view of an embodiment of the diffusion and/or filtration device of the invention.
Figure 3B:
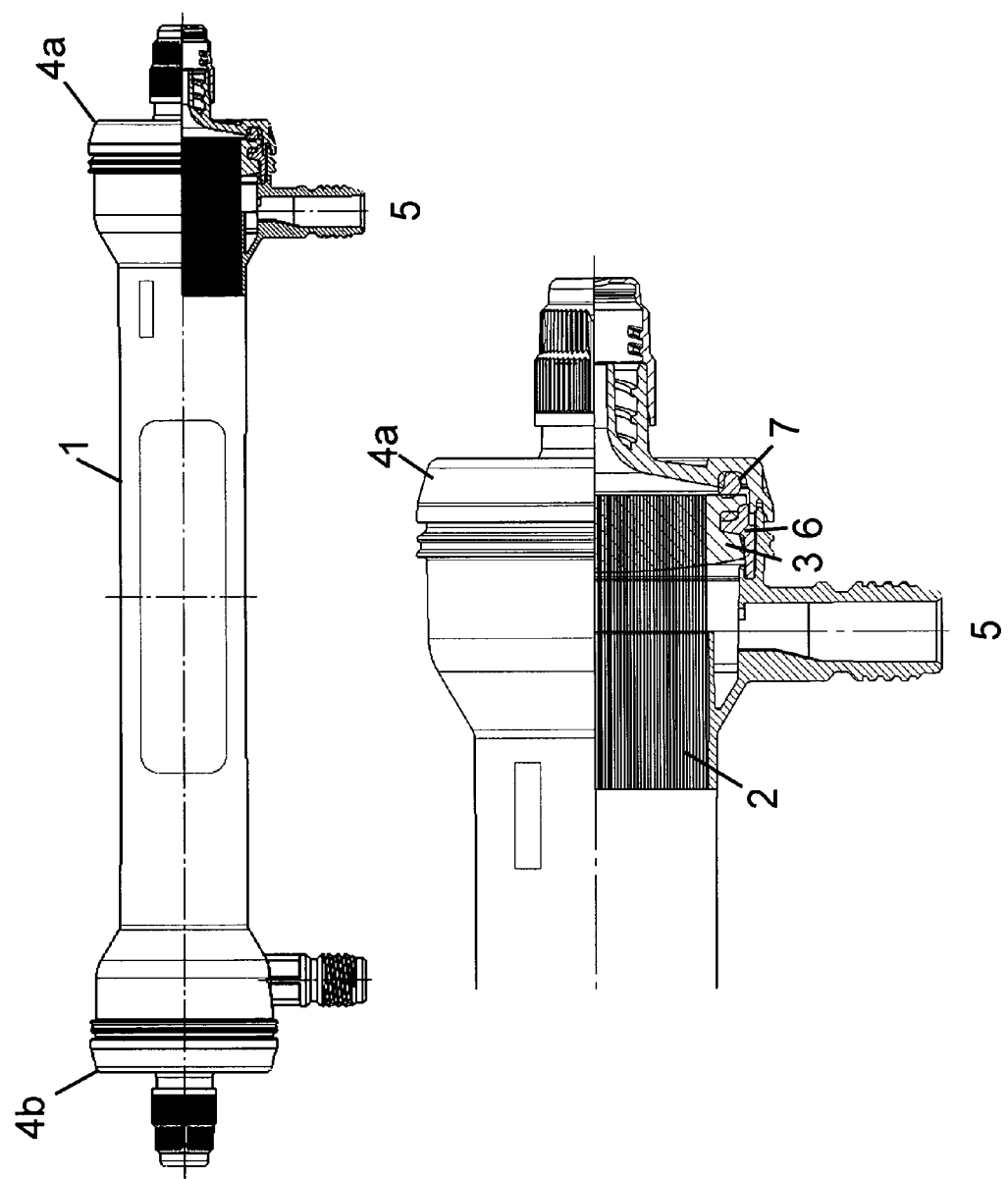
FIG. 3b shows a side, partially cross-sectional view of another embodiment of the diffusion and/or filtration device of the invention.

FIG. 3 shows an embodiment of the diffusion and/or filtration device of the invention comprising:

a) housing means (1), said housing means defining a longitudinally extending internal chamber including a first end and a second end;

b) a bundle of semi-permeable hollow fiber membranes (2) disposed within said internal chamber, said hollow fibers extending longitudinally from said first end of said housing to said second end of said housing, said hollow fiber membranes having an outer surface, and a first end and a second end corresponding to said first end and said second end of said internal chamber;

c) end wall means (3) supporting said first and second ends of said hollow fiber membranes within said internal chamber so as to sealingly separate said first and second ends of said hollow fiber membranes from said outer surface of said hollow fiber between said first and second ends thereof;

d) first inlet means for the introduction of a fluid into said first end of said housing means, said first inlet means being defined by a first end cap (4a) covering said first end of said housing;

e) first outlet means for the evacuation of a fluid from said second end of said housing means, said first outlet means being defined by a second end cap (4b) covering said second end of said housing, said first and second end caps being applied to said first and second ends of said housing in a fluid-tight manner;

f) second outlet means (5) for the evacuation of a fluid from said internal chamber at a location between said first and second end of said housing means;

g) at least one ring member (6) disposed between said end wall means and said housing means at one of said first and second ends of said internal chamber, said ring member being in direct contact with said housing and having a shape corresponding to said housing and defining a cavity between said ring member and said hollow fiber membranes, the coefficient of adhesion between said end wall means and said ring member being lower than the coefficient of adhesion between said end wall means and said housing, whereby the structural integrity of said housing means and the seal between said ends of said hollow fiber membranes and said outer surface of said hollow fiber membranes is enhanced; and h) at least one sealing ring (7) interposed between said end wall and said first inlet means.

In one embodiment, the diameter of the housing is not uniform. The housing has a middle section where the diameter is smaller than at the ends of the housing. Accordingly, the distances between the individual hollow fibers are smaller in the middle section of the device than at the end faces of the hollow fiber bundle In another embodiment, the housing has a diameter-expanding portion allowing hollow fiber membranes to be placed in a way that the distances between the hollow fiber membranes are gradually increased toward the end faces of the hollow fiber bundle.

The housing and end caps of the device of the invention are usually made of a transparent polymer, e.g. polyethylene, polypropylene, polyesters like PET or PBT, polymethyl (meth)acrylate, polystyrene (HIPS) or polycarbonate. The potting material for the hollow fiber membranes usually is polyurethane. In one embodiment of the device of the invention, the housing and caps are made of polycarbonate, the potting material forming the end wall means (3) is made of polyurethane and the sealing rings (7) are made of silicone rubber.

The hollow fiber membranes used in the device of the invention can be those described in EP 0 568 045 A1, EP 0 168 783 A1, EP 0 082 433 A2, WO 2004/056469 A1, EP 0 750 936 A1, or WO 86/00028 A1, all incorporated herein by reference. These membranes are manufactured from polymeric synthetic materials; they have an asymmetric structure with high diffusive permeability (clearance) and have water filtration capabilities in ultrafiltration applications in the range of low flux to high flux. Suitable examples are the membrane based on polysulfone and polyvinylpyrrolidone (PVP) disclosed in EP 0 750 936 A1 and the 4-layer membrane based on polyethersulfone, PVP and polyamide disclosed in WO 2004/056469 A1.

In general, the semipermeable hollow fiber membrane is based on at least one hydrophobic polymer and at least one hydrophilic polymer. Said at least one hydrophobic polymer is preferably chosen from the group consisting of polyamide (PA), polyaramide (PAA), polyarylethersulfone (PAES), polyethersulfone (PES), polysulfone (PSU), polyarylsulfone (PASU), polycarbonate (PC), polyether, polyurethane (PUR), polyetherimide and copolymers of said polymers. In a particular embodiment, the hydrophobic polymer is polysulfone, polyethersulfone or a mix of polyarylethersulfone and polyamide. In another particular embodiment, polyethersulfone is used for preparing the membrane.

Said at least one hydrophilic polymer is usually chosen from the group consisting of polyvinylpyrrolidone (PVP), polyethylene glycol (PEG), polyglycolmonoester, water soluble cellulosic derivates, polysorbate and polyethylenepolypropylene oxide copolymers. In a particular embodiment, polyvinylpyrrolidone is used for preparing the membrane, wherein the polyvinylpyrrolidone consists of a low molecular weight component having a molecular weight of below 100 kDa and a high molecular weight component having a molecular weight of 100 kDa or more.

One embodiment of the membrane consists of 80-99% by weight of said hydrophobic polymer, for instance polyethersulfone, and 1-20% by weight of said at least one hydrophilic polymer, for instance polyvinylpyrrolidone (PVP). The PVP consists of a high molecular weight ($\geqq$100 kDa) and a low molecular weight (<100 kDa) component, wherein the PVP consists of 10-45 weight-%, based on the total weight of PVP in the membrane, of a high molecular weight component, and of 55-90 weight-%, based on the total weight of PVP in the membrane, of a low molecular weight component.

In one embodiment, the membrane is further characterized by a very specific four-layer structure and by having a diffusive permeability of chloride of about $19.1 \cdot 10^{-4}$ cm/sec measured at 37° C. The diffusive permeability can be determined according to E. Klein, F. Holland, A. Lebeouf, A. Donnaud, J. K. Smith, "Transport and Mechanical Properties of Hemodialysis Hollow Fibers", Journal of Membrane Science 1 (1976) 371-396, especially pages 375-379.

The inner layer of the four-layer structure, i.e. the blood contacting layer and the inner surface of the hollow fiber membrane, is a separation layer in the form of a dense, rather thin layer having, in a particular embodiment, a thickness of less than 1 μm and a pore size in the nanoscale range. To achieve high selectivity, the pore channels with the responsible pore diameters are short, i.e. below 0.1 μm. The pore channel diameter has a low variation in size. The defined pore structure is achieved by selection of the composition of the polymer, the composition and condition of the precipitation media in the center fluid and by the condition and composition of the surrounding environment of the fiber leaving the spinning nozzle.

The next layer in the hollow fiber membrane is the second layer having the form of a sponge structure and serves as a support for said first layer. In a particular embodiment, the thickness of this layer ranges from about 1 to 15 μm.

Then, there is the third layer having the form of a finger structure. It provides for mechanical stability on the one hand; on the other hand it has, through the high void volume, a very low resistance of transport of molecules through the membrane. During the process, the voids are filled with water, and the water gives a lower resistance for diffusion and convection than a matrix with a sponge-filled structure having a lower void volume. Accordingly, the third layer provides mechanical stability to the membrane. In a particular embodiment, the thickness of this layer ranges from about 20 to 60 μm.

The fourth layer in this embodiment of the membrane is the outer layer, which is characterized by a homogenous and open pore structure with a defined surface roughness. The openings of the pores are in the size range of 0.5-3 μm, further the number of pores on the outer surface is in the range of 10,000 to 150,000 pores per mm², e.g. in the range of 20,000 to 80,000 pores per mm², in particular 35,000 to 55,000 pores per mm². In a particular embodiment, this fourth layer has a thickness of about 1 to 10 μm.

This four-layer design provides for a high selectivity, which means, a high potential to separate molecules, which are close in their size, for example, to separate albumin, which is to be retained, from a $\beta_2$-microglobulin and Factor D.

The membrane, due to its specific preparation and characteristics as described before, is characterized by a high convective permeability Lp and a high diffusive permeability for small molecules, such as, for example, urea or chloride ($P_{Cl}$). The Lp is in the range of from $56 \cdot 10^{-4}$ to $84 \cdot 10^{-4}$ cm/bar·s, e.g. from 70 to $80 \cdot 10^{-4}$ cm/bar·s. The chloride permeability $P_{Cl}$ is in the range of from $18 \cdot 10^{-4}$ to $21 \cdot 10^{-4}$ cm/s, e.g. from $19 \cdot 10^{-4}$ to $20 \cdot 10^{-4}$ cm/s.

The membrane is further characterized by a high selectivity, i.e. a high removal rate for middle molecular weight molecules, while at the same time the loss of protein of higher molecular weight is minimized. The membrane has a sieving coefficient ($SC_{Myo}$) for myoglobin (17,053 Dalton) in aqueous solution of from 85 to 90%, and a sieving coefficient ($SC_{Albu}$) for albumin (66,248 Dalton) in aqueous solution of 9% or less. The selectivity in aqueous solution of the membrane according to the invention, calculated as the ratio of $SC_{Myo}/SC_{Albu}$, accordingly ranges from 9.4 to 10 or higher.

The membrane can be prepared by a solvent phase inversion spinning process, comprising the steps of
 a) said at least one hydrophilic polymer and said at least one hydrophobic polymer being dissolved in at least one solvent to form a polymer solution;
 b) said formed polymer solution being extruded through an outer ring slit of a nozzle with two concentric openings;
 c) a center fluid being extruded through the inner opening of the nozzle; and thereafter
 d) said membrane being washed and preferably dried and sterilized by steam treatment.

The polymer solution coming out through the outer slit opening is, on the outside of the precipitating fiber, exposed to a humid steam/air mixture comprising a solvent in a content of between 0 and 10% by weight, related to the water content.

In one embodiment, the spinning solution for preparing a membrane preferably comprises between 12 and 15 weight-% of polyethersulfone or polysulfone as hydrophobic polymer and 5 to 10 weight-% of PVP, wherein said PVP consists of a low and a high molecular PVP component. The total PVP contained in the spinning solution consists of from 22 to 34 weight-% and particularly from 25 to 30 weight-% of a high molecular weight component and of from 66 to 78 weight-%, particularly from 70 to 75 weight-% of a low molecular weight component. Examples for high and low molecular weight PVP are PVP K85/K90 and PVP K30, respectively.

In one embodiment, the polymer solution used in the process for preparing a membrane further comprises 66-86% by weight of solvent and 1-5% by weight of suitable additives. Suitable additives are, for example, chosen form the group of water, glycerol and/or other alcohols. Water is especially preferred and is present in the spinning solution in an amount of between 1-8% by weight, particularly in an amount of between 2-5% by weight. The solvent used in the process preferably is chosen from the group comprising n-methylpyrrolidone (NMP), dimethyl acetamide (DMAC), dimethyl sulfoxide (DMSO), dimethyl formamide (DMF), butyrolactone and mixtures of said solvents. NMP is especially preferred. The spinning solution advantageously is homogeneously degassed and filtered.

The center fluid or bore liquid which is used for preparing the membrane comprises at least one of the above-mentioned solvents and a precipitation medium chosen from the group of water, glycerol and other alcohols. Most preferably the center fluid consists of 45-70% by weight precipitation medium and 30-55% by weight of solvent. In one embodiment, the center fluid consists of 51-57% by weight of water and 43-49% by weight of NMP. Again, the center fluid advantageously is degassed and filtered.

The viscosity of the polymer solution generally is in the range of from 2,500 to 7,000 mPa·s, e.g. from 3,500 to 6,000 mPa·s.

In one embodiment of the process for preparing a membrane, the temperature of the spinneret is 30-70° C., e.g. 45-55° C., the temperature of the spinning shaft is 25-65° C., e.g. 40-50° C. The distance between the opening of the nozzle and the precipitation bath is in the range of from 25 to 1,500 mm, e.g. from 550 to 1,100 mm. The precipitation bath has a temperature of 10-40° C., particularly of 15-25° C. The spinning velocity generally is in the range of 25-80 m/min, e.g. 30-60 m/min. The temperature of the humid steam/air mixture is at least 15° C., preferably at least 30° C., and at most 75° C., but is preferably not higher than 60° C. Further, the relative humidity in the humid steam/air mixture is between 60 and 100%.

In another embodiment of the process, the humid steam/air mixture comprises a solvent in an amount of from 0 to 5% by weight, related to the water content. In one embodiment, the humid steam/air mixture comprises a solvent in an amount of from 0 to 3% by weight, related to the water content. The effect of the solvent in the temperature-controlled steam atmosphere is to control the speed of precipitation of the fibers. If less solvent is employed, the outer surface will obtain a more dense surface, and if more solvent is used, the outer surface will have a more open structure. By controlling the amount of solvent within the temperature-controlled steam atmosphere surrounding the precipitating membrane, the amount and size of the pores on the outer surface of the membrane can be modified and controlled.

In one embodiment, the membrane is subsequently washed in water to remove waste components, and then dried at temperatures of 150-280° C., for instance 180-260° C. Such drying provides for an adequate evaporation of water and a defined shrinkage of pores. The final treatment consists of rinsing the membrane in water at a temperature of 50-95° C., e.g. 80-90° C., and subsequently drying the membrane at temperatures of 30-65° C., e.g. 55-65° C.

In one embodiment, the membrane is steam sterilized at temperatures above 121° C. for at least 21 minutes.

In one embodiment, the hollow fiber membrane has an inner diameter of between 180 and 200 µm. In a particular embodiment, the inner diameter is approximately 190 µm. The wall thickness of the hollow fiber generally is in the range of from 30 to 40 µm, e.g. approximately 35 µm.

In a particular embodiment of the invention, the bundle of hollow fibers (2) has a diameter of 38 mm and a length of 236 mm and comprises approximately 12,000 fibers. The individual fibers have an outer diameter of 0.26 mm, an inner diameter of 0.19 mm and a wall thickness of 35 µm. The fiber bundle has a surface area of 1.8 m². The individual fibers are curled having a sinusoidal texture with a wavelength of 7.5 mm and an amplitude of 0.3 mm. The membrane is made of polyethersulfone and polyvinylpyrrolidone consisting of a low molecular weight component having a molecular weight less than 100 kDa and a high molecular weight component having a molecular weight of 100 kDa or more.

In another particular embodiment of the invention, the bundle of hollow fibers (2) has a diameter of 38 mm at the ends and a diameter of 34 mm in the central section and a length of 236 mm and comprises approximately 9,600 fibers. The individual fibers have an outer diameter of 0.26 mm, an inner diameter of 0.19 mm and a wall thickness of 35 µm. The fiber bundle has a surface area of 1.4 m². The individual fibers are curled having a sinusoidal texture with a wavelength of 7.5 mm and an amplitude of 0.3 mm. The membrane is made of polyethersulfone and polyvinylpyrrolidone consisting of a low molecular weight component having a molecular weight less than 100 kDa and a high molecular weight component having a molecular weight of 100 kDa or more.

The device in vitro has sieving coefficients (measured according to EN 1283) of 1.0 for vitamin $B_{12}$, 1.0 for Inulin, 0.7 for $\beta_2$-microglobuline, and <0.01 for albumin. The UF coefficient (ml/h*mmHg) in vitro, measured according to EN 1283, with bovine blood (hematocrit=32%, protein=60 g/l, at 37° C.) has a value of 60±20%. The maximum flow resistance in the blood compartment, measured according to EN 1283 at UF=0 ml, with bovine blood (hematocrit=32%, protein=60 g/l, at 37° C.), is less than 100 mmHg at $Q_B$=200 ml/min, less than 135 mmHg at $Q_B$=300 ml/min, less than 170 mmHg at $Q_B$=400 ml/min, and less than 205 mmHg at $Q_B$=500 ml/min. The maximum flow resistance in the dialysate compartment, measured according to EN 1283 at UF=0 ml, with dialysate at 37° C., is less than 45 mmHg at $Q_B$=500 ml/min, less than 60 mmHg at $Q_B$=700 ml/min, and less than 65 mmHg at $Q_B$=800 ml/min. The residual blood volume is less than 1 ml.

Table 1 lists the values for the clearance in vitro of several substances contained in blood, measured according to EN 1283 at UF=0 ml/min. The accuracy of the measurement is ±10%.

TABLE 1

Clearance in hemodialysis (HD)

| | $Q_B$ [ml/min] | | | |
|---|---|---|---|---|
| | 200 | 300 | 400 | 500 |
| Clearance [ml/min] of urea | | | | |
| ($Q_D$ = 500 ml/min) | 198 | 282 | 339 | 376 |
| ($Q_D$ = 700 ml/min) | 199 | 291 | 365 | 422 |
| Clearance [ml/min] of creatinin | | | | |
| ($Q_D$ = 500 ml/min) | 195 | 265 | 311 | 341 |
| ($Q_D$ = 700 ml/min) | 197 | 278 | 339 | 384 |
| Clearance [ml/min] of phosphate | | | | |
| ($Q_D$ = 500 ml/min) | 191 | 256 | 297 | 324 |
| ($Q_D$ = 700 ml/min) | 195 | 270 | 324 | 365 |
| Clearance [ml/min] of vitamin $B_{12}$ | | | | |
| ($Q_D$ = 500 ml/min) | 158 | 191 | 211 | 225 |
| ($Q_D$ = 700 ml/min) | 164 | 205 | 231 | 251 |

It will be understood that the features mentioned above and those described hereinafter can be used not only in the combination specified but also in other combinations or on their own, without departing from the scope of the present invention.

The present invention will now be described in more detail in the examples below. It is to be understood that the examples are not intended to limit the scope of the present invention and are merely an illustration of a preferred embodiment of the invention.

EXAMPLES

Uniform distribution of fluid flows within the dialyzer is critical for optimal clearance of uremic toxins and avoidance of residual blood loss and clotting (thrombogenicity). Magnetic Resonance Imaging (MRI) was used to evaluate (a) the distribution and dynamics of blood flow in five types of hemodialyzers, and (b) the distribution and dynamics of dialysate flow in five types of hemodialyzers. The dialyzers studied were PES/PVP, 12,000 fibers, fiber length 260 mm, effective surface area 1.8 m², D=39.8 mm, α=9.53°, h=1.75 mm, outer diameter of the housing 40.7 mm (Revaclear® Max, Gambro)

PES/PVP, 9,600 fibers, fiber length 260 mm, effective surface area 1.4 m², D=39.8 mm, α=9.53°, h=1.75 mm, outer diameter of the housing 36.6 mm (Revaclear®, Gambro)

PES/PVP, 12,000 fibers, fiber length 300 mm, effective surface area 2.1 m², D=48 mm, α=10.8°, h=1.75 mm, outer diameter of the housing 51.9 mm (Polyflux® 210H, Gambro)

PSf/PVP, 10,300 fibers, fiber length 255 mm, effective surface area 1.5 m², D=45.7 mm, α=8.3°, h=2.6 mm, outer diameter of the housing 43.8 mm (Optiflux® 160NR, Fresenius)

PSf/PVP, 14,000 fibers, fiber length 255 mm, effective surface area 2.0 m², D=54.0 mm, α=7.2°, h=2.6 mm, outer diameter of the housing 51.6 mm (Optiflux® 200NR, Fresenius)

Figure 4:
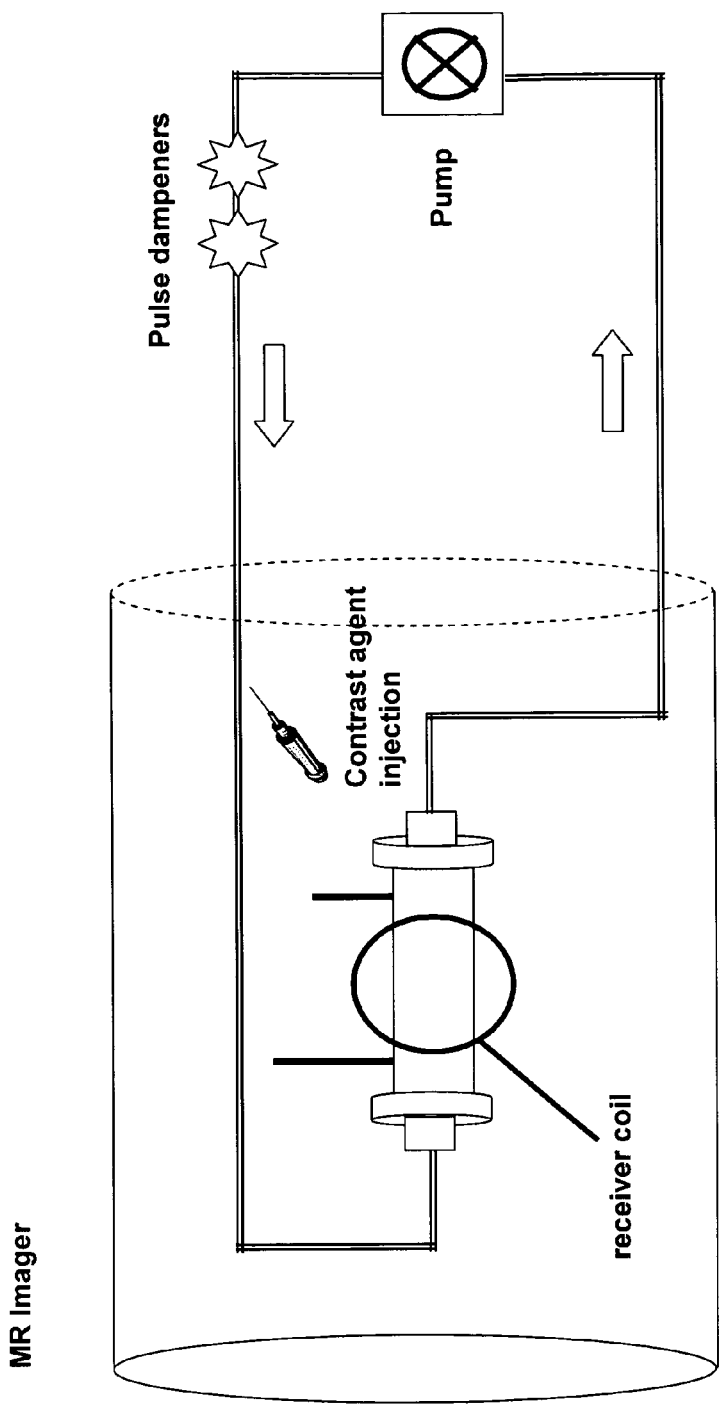
FIG. 4 shows an experimental set up for imaging dialyzers to measure the blood-side flow.
Figure 5:
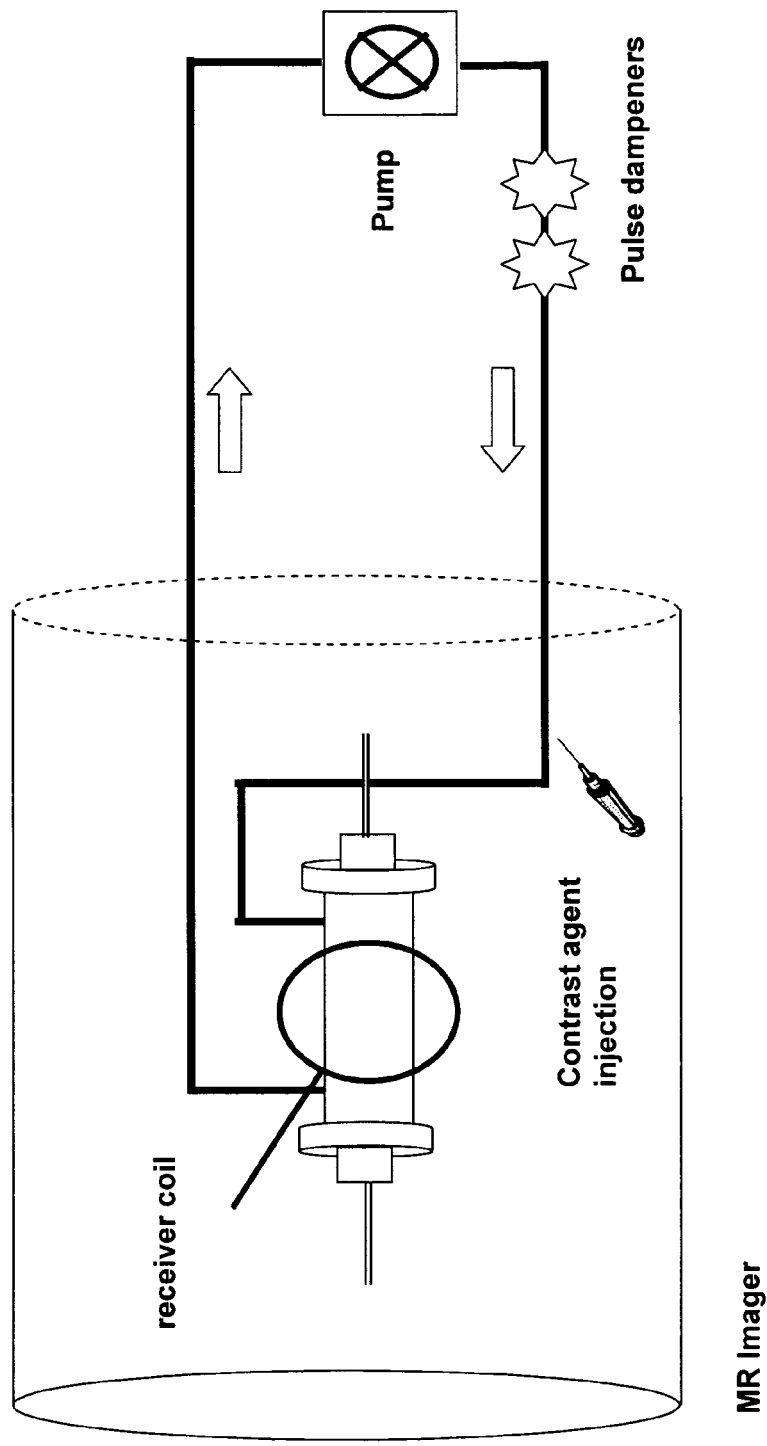
FIG. 5 shows an experimental set up for imaging dialyzers to measure the dialysate-side flow.
Figure 6:
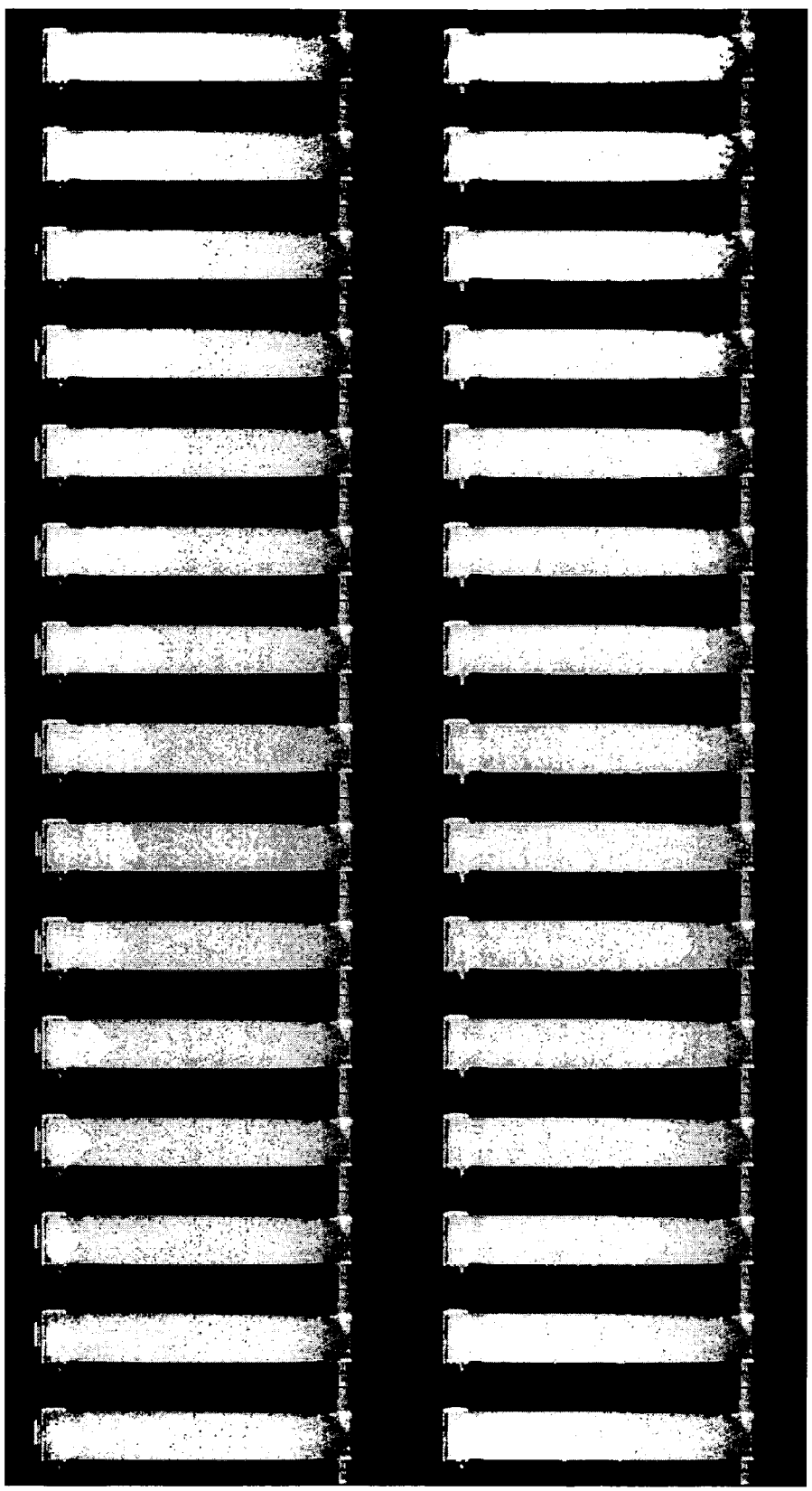
FIG. 6 shows blood compartment dynamic flow images obtained by magnetic resonance imaging for a Revaclear® Max dialyzer.
Figure 7:
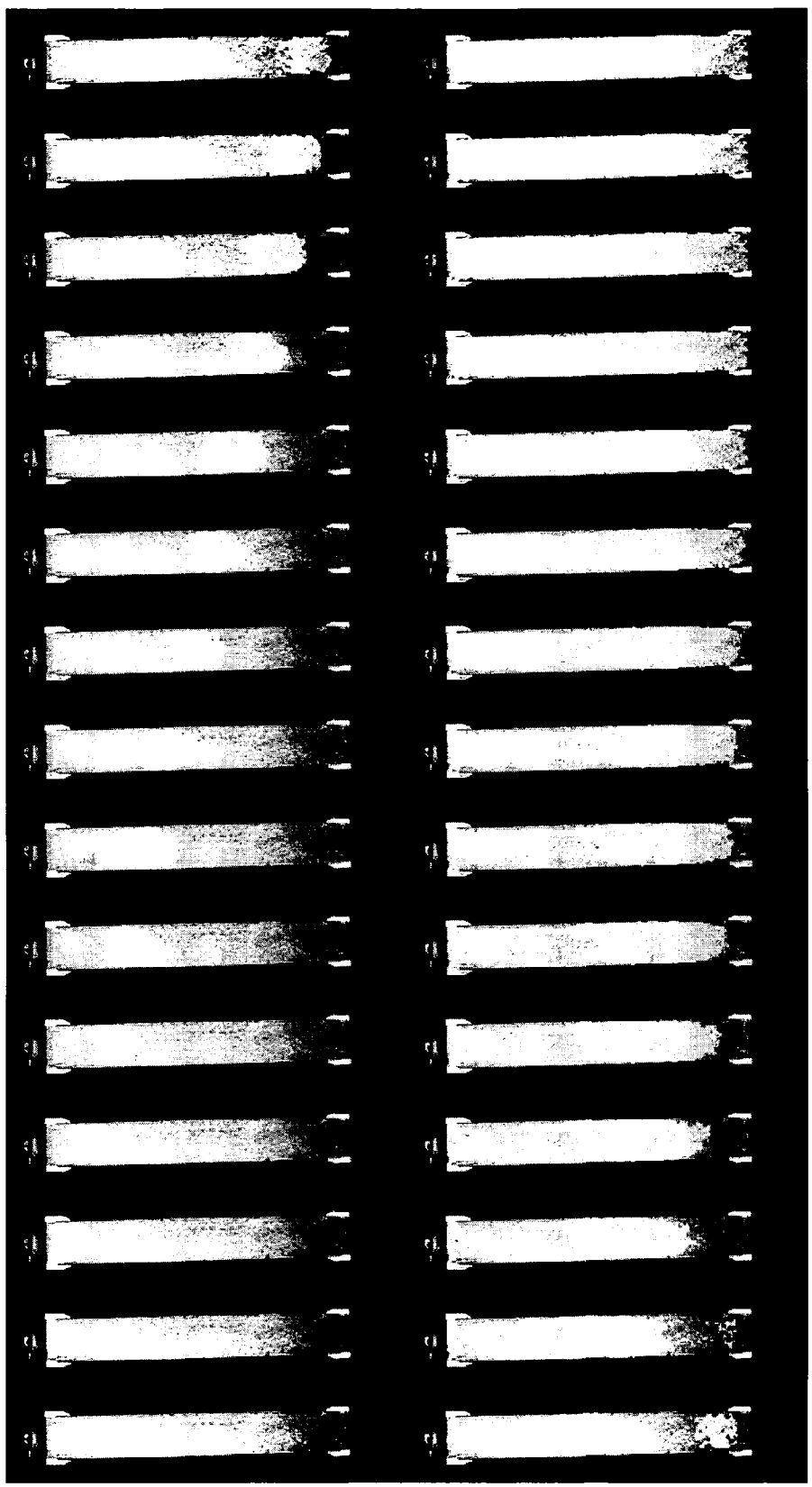
FIG. 7 shows blood compartment dynamic flow images obtained by magnetic resonance imaging for a Revaclear® dialyzer.
Figure 8:
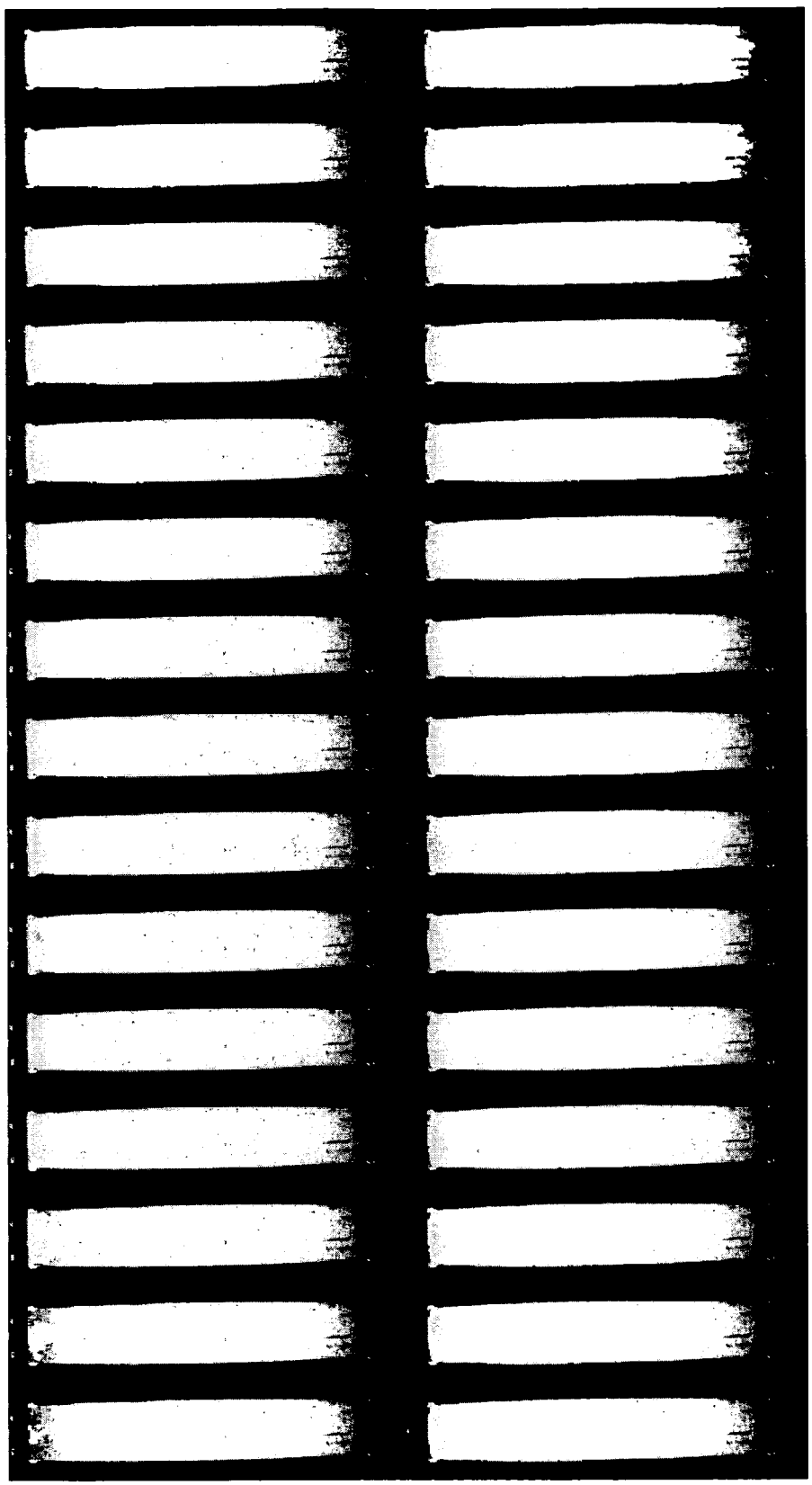
FIG. 8 shows blood compartment dynamic flow images obtained by magnetic resonance imaging for a Polyflux® 210H dialyzer.
Figure 9:
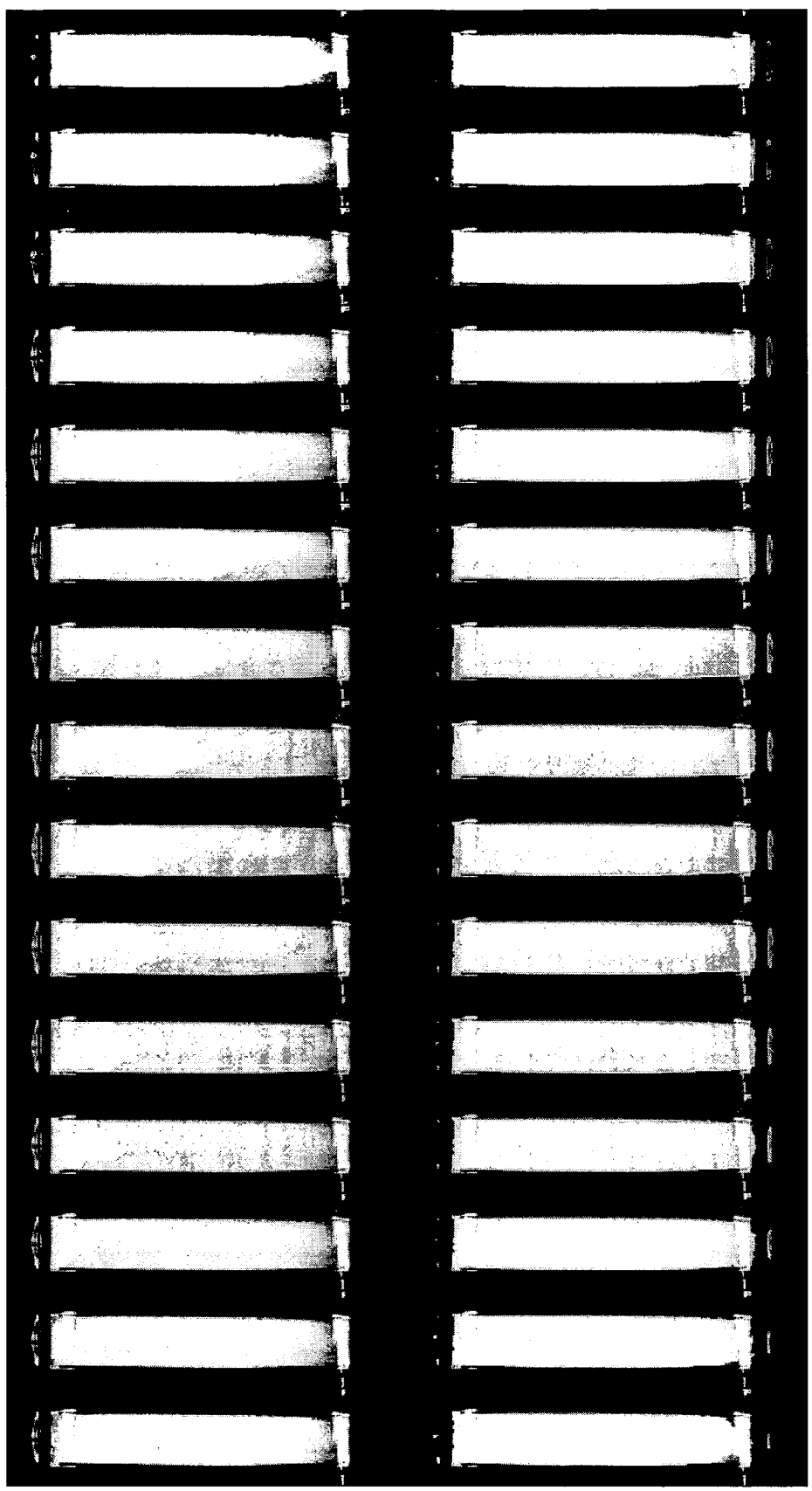
FIG. 9 shows blood compartment dynamic flow images obtained by magnetic resonance imaging for a Optiflux® F160NR dialyzer.
Figure 10:
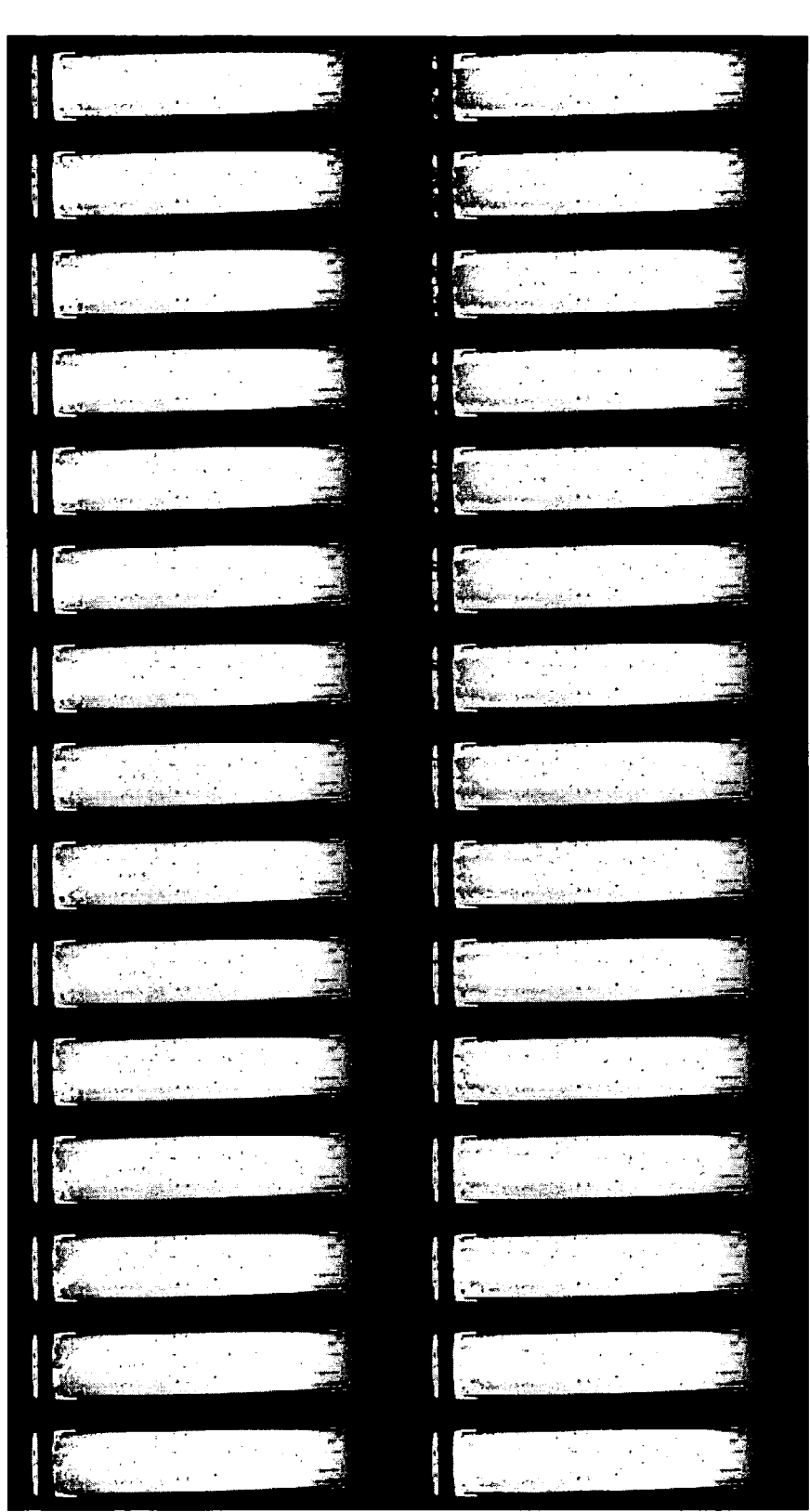
FIG. 10 shows blood compartment dynamic flow images obtained by magnetic resonance imaging for a Optiflux® F200NR dialyzer.
Figure 11:
FIG. 11 shows dialysate compartment dynamic flow images obtained by magnetic resonance imaging for a Revaclear® Max dialyzer.
Figure 12:
FIG. 12 shows dialysate compartment dynamic flow images obtained by magnetic resonance imaging for a Revaclear® dialyzer.
Figure 13:
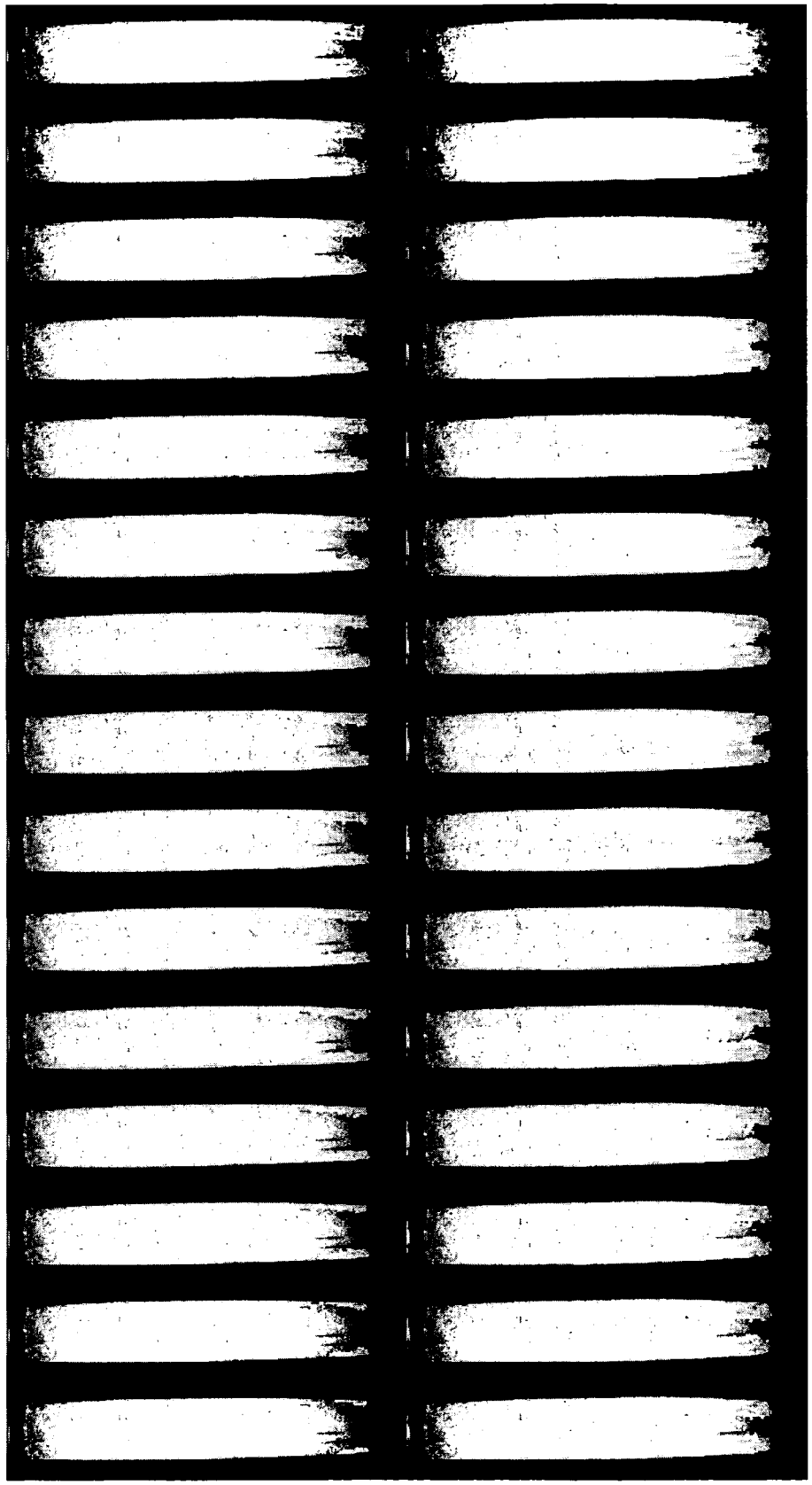
FIG. 13 shows dialysate compartment dynamic flow images obtained by magnetic resonance imaging for a Polyflux® 210H dialyzer.
Figure 14:
FIG. 14 shows dialysate compartment dynamic flow images obtained by magnetic resonance imaging for a Optiflux® F160NR dialyzer.
Figure 15:
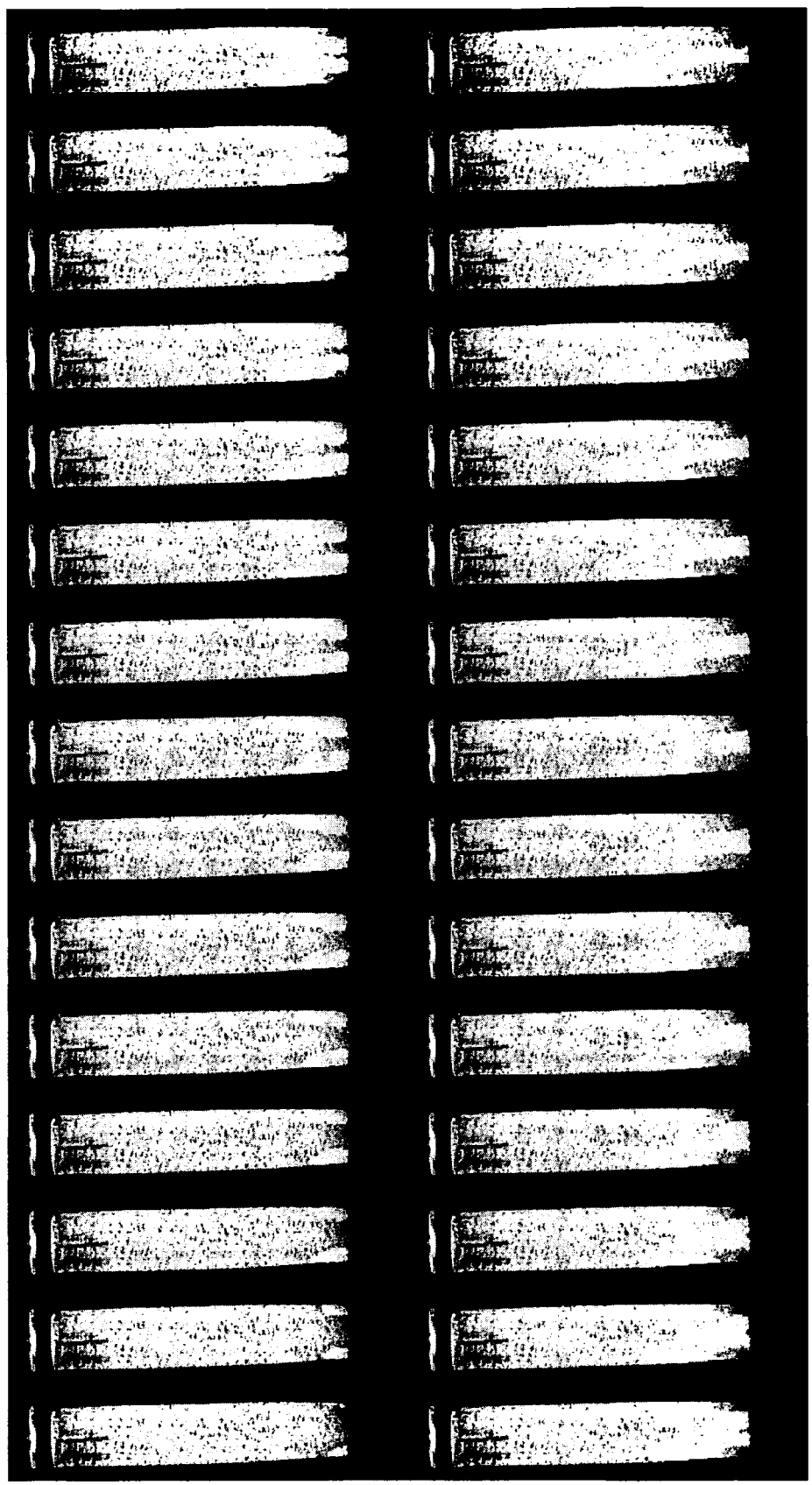
FIG. 15 shows dialysate compartment dynamic flow images obtained by magnetic resonance imaging for a Optiflux® F200NR dialyzer.

All imaging was performed using a 3.0T Siemens Trio, MR Imager. The CP Head coil was used for both signal excitation and reception as its size allowed for complete coverage of the dialyzers. The experimental set up for measuring the blood-side flow is shown in FIG. 4 while FIG. 5 shows the experimental set up for measuring the dialysate flow.

For both the dialysate and the blood-side flow the fluid used was water which was circulated from a 20 l reservoir via a roller ball pump. The pulsations in the flow created by the roller ball pump were damped by inserting two Cole-Parmer pulse dampeners into the circuit immediately after the pump. The flow rate was measured using a Cole-Parmer flow gauge which was calibrated by measuring the rate for filling a graduate cylinder to a specified volume. To achieve fluid flows of 350 ml/min or 500 ml/min, gauge settings of 105 or 149, respectively, were used.

For each dialyzer, dynamic MR imaging of fluid flow was performed. Images were acquired in rapid acquisition while 5 ml of a small molecular weight contrast agent (Magnevist™, $C_{28}H_{54}GdN_5O_{20}$; MW=938) was injected as a bolus into either the dialysate or the blood-side flow. The resulting images demonstrate the passage of the bolus of contrast agent as a diminishment in the image intensity where high concentrations of the agent were present Dynamic images were acquired in the sagittal (through the inlet and outlet of the dialysate side) and coronal (longitudinal section perpendicular to the sagittal plane) planes of each dialyzer. The images were acquired with a single-shot rapid acquisition, repeated echo (RARE) sequence. A single plane image was acquired in each case with a repetition time of 500 ms. In total 64 images were acquired and the contrast media was acquired after approximately 10 images had been acquired. A volume of 5 ml of Magnevist™ diluted to 250 mM was injected into the inlet of either the blood-side or the dialysate-side flow.

The contrast media was carried by the fluid flow and passed rapidly through the dialyzer. Its presence affected the image intensity because it lowered the relaxation time T2 of the fluid. Thus on the image the contrast media was noted by the transient decrease in image intensity. The images were analyzed by comparing the image intensity of every frame to the image intensity averaged over the first several frames. Regions where the image intensity declined substantially were colored to indicate the presence of the contrast media.

The results are shown in FIG. 6 through 15, FIGS. 6-10 showing the flow in the blood compartment of the respective dialyzers, while FIG. 11-15 show the flow in the dialysate compartment of the respective dialyzers. Revaclear® showed the greatest uniformity of both blood and dialysate flows. Excellent flow dynamics were also seen with the Revaclear® Max. The pictures demonstrate the superior blood and dialysate flow characteristics and dynamics of the end cap and the diffusion and/or filtration device of the invention in comparison to those known in the art.

The invention claimed is:

1. An end cap for at least one of a diffusion device and a filtration device, the end cap having an inner surface which is axially symmetrical with regard to a longitudinal axis of the end cap and an inner surface having the form of a funnel and comprising, in the direction of increasing diameter, a first section (I) taking the form of at least one of a cylinder and a truncated cone, a middle section (II) taking the form of a torus segment, the radius R of the middle section (II) being in the range of from 4 mm to 10 mm, and a third section (III) taking the form of a truncated cone, wherein the diameter D of the base of the third section (III) and the angle α between the base of the third section and the lateral surface of the third section (III) and the volume V calculated according to the formula $$V=(\pi D^2/4)\times(h+D\tan\alpha/6) \quad (I),$$

wherein h is the minimum distance between the inner surface of the third section (III) of the end cap and the plane defined by the ends of the hollow fiber membranes, when the end cap is mounted on the at least one of a diffusion device and a filtration device, meet the condition:

$$1{,}000\times D/V > a_1\times(\tan\alpha)^2+6 \quad (II),$$

with $a_1=100$.

2. The end cap of claim 1, wherein $$1{,}000\times D/V < a_2\times(\tan\alpha)^2+9 \quad (III),$$

with $a_2=1{,}400$.

3. The end cap of claim 1 wherein $$90\times10^{-6}\text{ mm}^{-2} < \tan\alpha/D^2 < 120\times10^{-6}\text{ mm}^{-2} \quad (IV).$$

4. The end cap of claim 1 wherein the diameter D is in the range of from 15 to 60 mm.

5. The end cap of claim 1 wherein the distance h is in the range of from 1.5 to 2.0 mm.

6. The end cap of claim 1 wherein the first section (I) takes the form of a truncated cone with an aperture of from 0 to 4°.

7. The end cap of claim 1 wherein the top of the first section (I) has a diameter of 3.7±0.1 mm, the aperture of the first section (I) is 2.0±0.1°, R is 7.0±0.1 mm, α is 9.53±0.05°, and D is 39.8±0.05 mm.

8. At least one of a diffusion device and a filtration device, the device comprising a housing, a bundle of semi-permeable hollow fiber membranes arranged within the housing, and end caps, each end cap having an inner surface which is axially symmetrical with regard to a longitudinal axis of the end cap and an inner surface having the form of a funnel and comprising, in the direction of increasing diameter, a first section (I) taking the form of at least one of a cylinder and a truncated cone, a middle section (II) taking the form of a torus segment, the radius R of the middle section (II) being in the range of from 4 mm to 10 mm, and a third section (III) taking the form of a truncated cone, wherein the diameter D of the base of the third section (III) and the angle α between the base of the third section and the lateral surface of the third section (III) and the volume V calculated according to the formula $$V=(\pi D^2/4)\times(h+D\tan\alpha/6) \quad (I),$$

wherein h is the minimum distance between the inner surface of the third section (III) of the end cap and the plane defined by the ends of the hollow fiber membranes, when the end cap is mounted on the at least one of a diffusion device and a filtration device, meet the condition:

$$1{,}000\times D/V > a_1\times(\tan\alpha)^2+6 \quad (II),$$

with $a_1=100$ sealing the mouths of the housing.

9. The at least one of a diffusion device and a filtration device of claim 8 comprising:
   a) a housing defining a longitudinally extending internal chamber including a first end and a second end;
   b) a bundle of semi-permeable hollow fiber membranes disposed within said internal chamber, said hollow fiber membranes extending longitudinally from said first end of said housing to said second end of said housing, said hollow fiber membranes having an outer surface, and a first end and a second end corresponding to said first end and said second end of said internal chamber;

c) end walls supporting said first and second ends of said hollow fiber membranes within said internal chamber so as to sealingly separate said first and second ends of said hollow fiber membranes from said outer surface of said hollow fiber membranes between said first and second ends thereof;
d) a first inlet for the introduction of a fluid into said first end of said housing, said first inlet being defined by a first end cap covering said first end of said housing;
e) a first outlet for the evacuation of a fluid from said second end of said housing, said first outlet being defined by a second end cap covering said second end of said housing, said first and second end caps being applied to said first and second ends of said housing in a fluid-tight manner;
f) a second outlet for the evacuation of a fluid from said internal chamber at a location between said first and second end of said housing;
g) at least one ring member disposed between said end wall and said housing at one of said first and second ends of said internal chamber, said at least one ring member being in direct contact with said housing and having a shape corresponding to said housing and defining a cavity between said ring member and said hollow fiber membranes, the coefficient of adhesion between said end wall and said ring member being lower than the coefficient of adhesion between said end wall and said housing, whereby the structural integrity of said housing and the seal between said ends of said hollow fiber membranes and said outer surface of said hollow fiber membranes is enhanced; and
h) at least one sealing ring interposed between said end wall and said first inlet.

10. The end cap of claim 2 wherein $$90 \times 10^{-6} \, mm^{-2} < \tan \alpha / D^2 < 120 \times 10^{-6} \, mm^{-2} \quad \text{(IV)}.$$

11. The end cap of claim 2 wherein the diameter D is in the range of from 15 to 60 mm.

12. The end cap of claim 3 wherein the diameter D is in the range of from 15 to 60 mm.

13. The end cap of claim 10 wherein the diameter D is in the range of from 15 to 60 mm.

14. The end cap of claim 2 wherein the distance h is in the range of from 1.5 to 2.0 mm.

15. The end cap of claim 3 wherein the distance h is in the range of from 1.5 to 2.0 mm.

16. The end cap of claim 4 wherein the distance h is in the range of from 1.5 to 2.0 mm.

17. The end cap of claim 10 wherein the distance h is in the range of from 1.5 to 2.0 mm.

18. The end cap of claim 11 wherein the distance h is in the range of from 1.5 to 2.0 mm.

19. The end cap of claim 12 wherein the distance h is in the range of from 1.5 to 2.0 mm.

20. The end cap of claim 13 wherein the distance h is in the range of from 1.5 to 2.0 mm.

* * * * *